United States Patent [19]

Messina

[11] Patent Number: 5,524,903

[45] Date of Patent: Jun. 11, 1996

[54] SEALING DEVICE, ON TUBULAR AND/OR CIRCULAR TANKS, FOR FIRING MEMBRANE VALVES, FOR CLEANING SLEEVE FILTERS

[75] Inventor: Aurelio Messina, Cusano Milanino, Italy

[73] Assignee: Compagnie Du Pacifique S.A., Luxembourg, Luxembourg

[21] Appl. No.: 278,171

[22] Filed: Jul. 21, 1994

[30] Foreign Application Priority Data

Oct. 27, 1993 [IT] Italy .................... MI930835 U

[51] Int. Cl.⁶ .................... F16J 15/10; F16K 31/365
[52] U.S. Cl. .................... 277/012; 277/101; 251/144
[58] Field of Search .................... 277/100, 101, 277/12, 207 A; 137/15, 315, 318, 590, 592, 454.2; 251/129.011, 144; 285/197

[56] References Cited

U.S. PATENT DOCUMENTS

| | | | |
|---|---|---|---|
| 3,435,896 | 4/1969 | Williams | 137/592 |
| 3,806,085 | 4/1974 | Codo | 251/144 |
| 3,870,064 | 3/1975 | Vigneron | 285/197 |
| 4,003,399 | 1/1977 | Fischer | 137/592 |
| 4,968,066 | 11/1990 | Adams | 285/197 |
| 5,197,710 | 3/1993 | Wass et al. | 251/144 |
| 5,207,461 | 5/1993 | Lasko | 285/197 |
| 5,297,578 | 3/1994 | Scott et al. | 137/590 |

*Primary Examiner*—Scott W. Cummings
*Attorney, Agent, or Firm*—Bucknam and Archer

[57] ABSTRACT

The present invention relates to a sealing device, on tubular and/or circular tanks, for firing membrane valves, for cleaning sleeve filters, which comprises, inside a tubular and/or circular tank, a firing pipe, one end of which is connected to a membrane solenoid valve and the other end of which tightly projects from the tank. The device is characterized in that it comprises a fitting, connected to the firing pipe and including a recess for housing therein a sealing ring for providing a sealed coupling with the outer surface of the tank, as well as a sealing coupling surface for the solenoid valve. Moreover, a washer element is provided, which can be coupled to the other end of the firing pipe, and supports the sealing ring for providing a sealed connection between the firing pipe and the tank.

1 Claim, 2 Drawing Sheets

5,524,903

SEALING DEVICE, ON TUBULAR AND/OR CIRCULAR TANKS, FOR FIRING MEMBRANE VALVES, FOR CLEANING SLEEVE FILTERS

BACKGROUND OF THE INVENTION

The present invention relates to a sealing device, on tubular and/or circular tanks, for firing membrane valves, for cleaning sleeve filters.

As is known, for cleaning sleeve filters there are at present used membrane valves, coupled to firing pipes, said valves being applied to a tank containing pressurized air.

With tubular and/or circular tanks, in order to provide the sealing, there are at present welded flanges on the surface of the tank, at the fitting region of the firing pipe and at the connection region of the solenoid valve, so as to provide an abutment surface adapted for the desired sealed connection.

Such a machining is very expensive and requires a very great skillness by the operator, who must weld at critical regions.

SUMMARY OF THE INVENTION

Accordingly, the aim of the present invention is to overcome the above mentioned drawbacks, by providing a sealing device, on tubular and/or circular tanks, for firing membrane valves, for cleaning sleeve filters, which allows the possibility of easily and quickly coupling the membrane valve and firing pipe without performing any welding operations.

Within the scope of the above mentioned aim, a main object of the present invention is to provide such a sealing device which is specifically designed for greatly simplifying all of the machining operations, while providing very high sealing, reliability and use safety characteristics, and which, moreover, can be easily made starting from easily commercially available elements and materials and which, moreover, is very competitive from a mere economic standpoint.

According to one aspect of the present invention, the above mentioned aim and objects, as well as yet other objects, which will become more apparent hereinafter, are achieved by a sealing device, on tubular and/or circular tanks, for firing membrane valves, for cleaning sleeve filters, comprising, inside a tubular and/or circular tank, a firing pipe having one end thereof coupled to a membrane solenoid valve and having the other end thereof tightly projecting from said tank, characterized in that said device further comprises a fitting element coupled to said firing pipe and including a recess for housing therein sealing means for providing a sealed connection with the outer surface of said tank, as well as with a sealing coupling surface for said solenoid valve, there being moreover provided a washer element, which can be coupled to said other end of said firing pipe and supporting sealing means for providing a sealed connection between said firing pipe and tank.

BRIEF DESCRIPTION OF THE DRAWINGS

Further characteristics and advantages of the present invention will become more apparent hereinafter from the following detailed disclosure of a sealing device, on tubular and/or circular tanks, for firing membrane valves, for cleaning sleeve filters, which is illustrated, by way of an indicative, but not limitative, example, in the figures of the accompanying drawings, where.

DESCRIPTION OF THE PREFERRED EMBODIMENT

Figure 1:
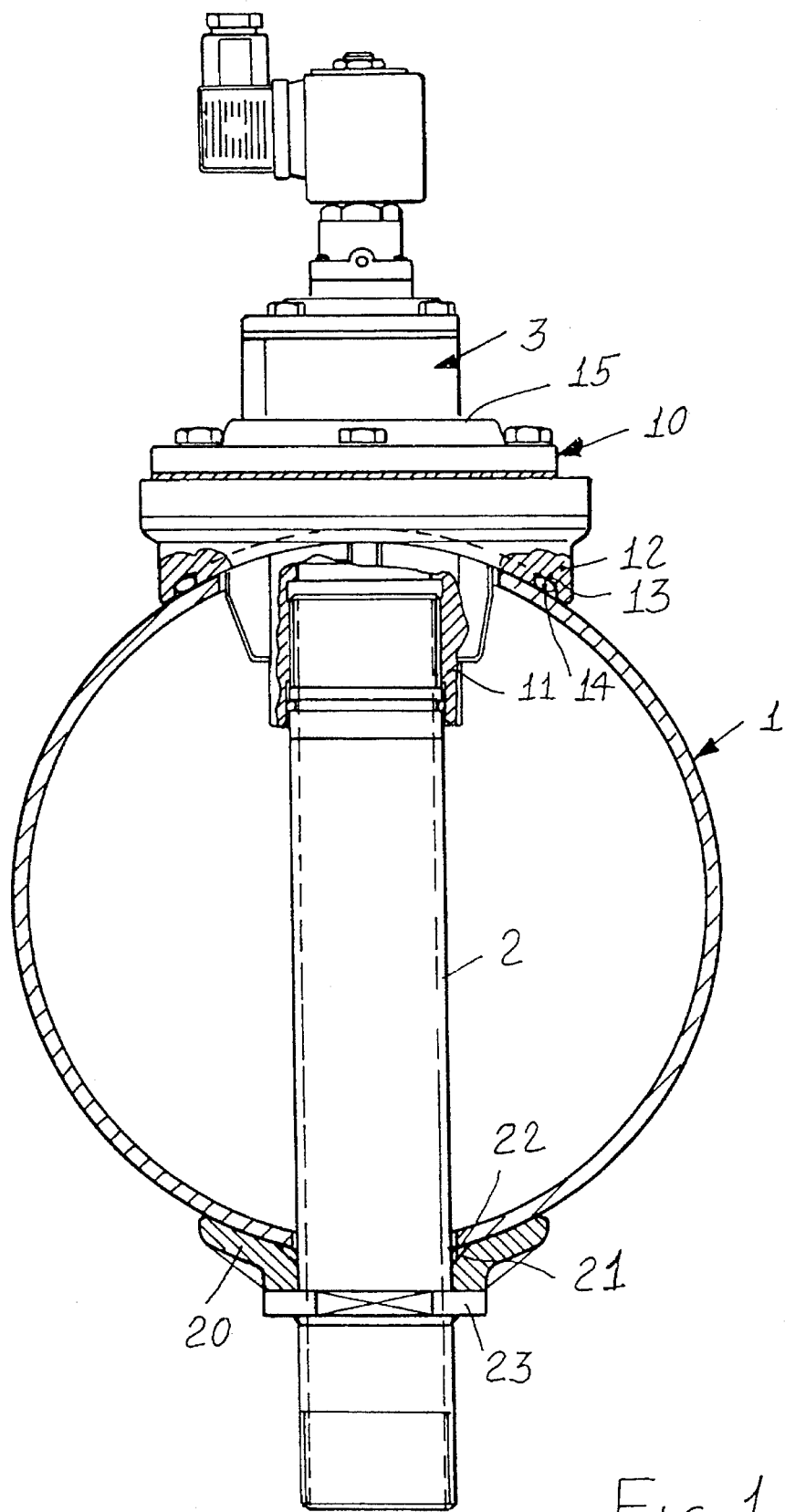
FIG. 1 is a cross-sectional view illustrating the device according to the present invention applied to a circular tank.
Figure 2:
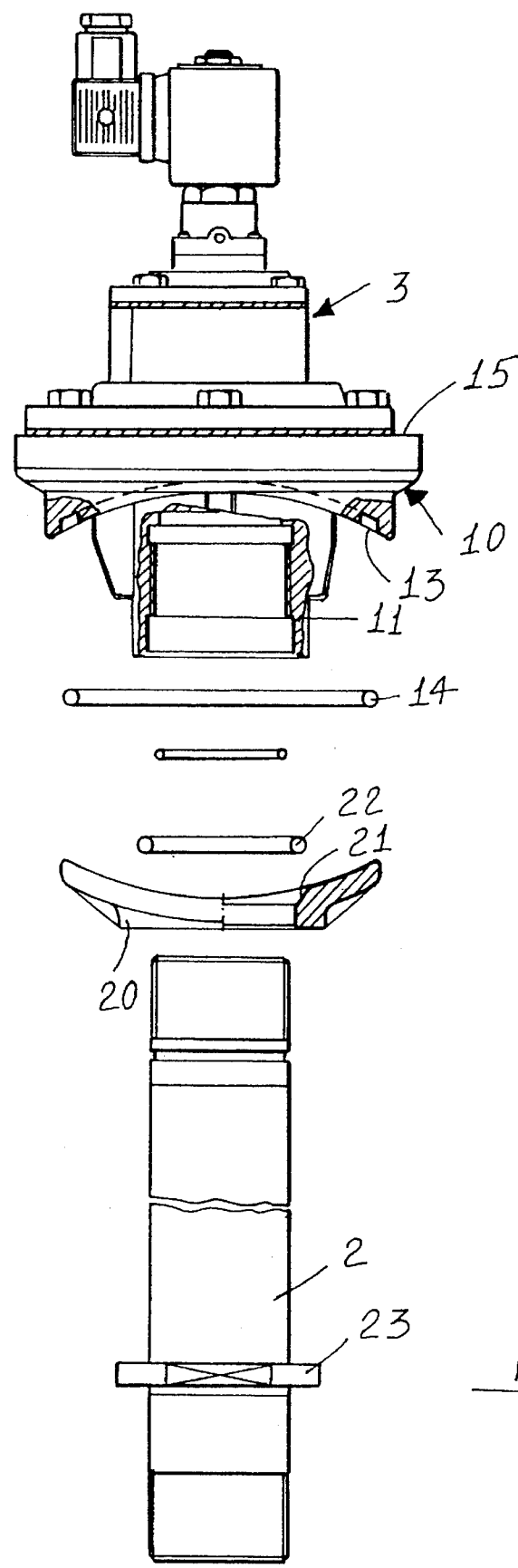
FIG. 2 is a partial cross-sectional view, in exploded form, illustrating the main component elements of the sealing device according to the present invention.

With reference to the number references of the above mentioned drawing figures, the sealing device, on tubular and/or circular tanks, for firing membrane valves, for cleaning sleeve filters, comprises a tank 1, of circular and/or tubular shape, in the inside of which there is diametrically provided a firing pipe 2, which is coupled to a firing solenoid valve, generally indicated at the reference number 3.

A main feature of the present invention is that, at one end of the firing pipe and, more specifically, at the top end thereof, as shown in the drawings, there is provided a fitting element 10 which includes a central portion 11, for coupling with the firing pipe, and being provided with an edge portion 12, including a recess having a shape mating that of the outer surface of the tank 1.

Inside said recess there is provided an annular groove 13, in which there is engaged an O-ring 14, providing a sealing means between the fitting element 10 and outer surface of the tank.

On the opposite face thereof, the fitting element 10 is provided with a surface 15 adapted to provide a sealed connection with the body of the solenoid valve.

At the other end portion of the firing pipe, there is provided a washer element 20, of tapered configuration, which is coupled about the firing pipe 2 and which, at a central portion thereof, is provided with a groove 21 therein can be engaged a sealing gasket 22 operating between the firing pipe and tank so as to provide a sealed connection.

In particular, the sealing gasket 22 is held in a set position by means of the washer element 20 which is clamped by a ring-nut 23 threaded on the firing pipe.

Accordingly, with the disclosed arrangement, it is possible to provide a perfect sealing connection between the firing solenoid valve and tank, without the need of welding flanges on the outer surface in order to provide the sealed coupling.

In practicing the invention, the used materials, provided that they are compatible with the intended use, as well as the contingent size and shapes, can be any, depending on requirements.

I claim:

1. A sealing device to be applied to a tubular tank for firing membrane valves, for cleaning sleeve filters, said tubular tank including in an inside space thereof a firing pipe having a first end and a second end, said first end being coupled to a membrane solenoid valve and said second end tightly projecting from said tubular tank, wherein said sealing device comprises a fitting element having a central portion for coupling with said first end of said firing pipe and an edge portion including a recess having a shape mating that of an outer surface of said tubular tank, a groove being formed inside said recess, in said groove being engaged a sealing O-ring tightly abutting on said outer surface of said tubular tank, said fitting element being provided with a surface adapted to provide a sealed connection with said membrane solenoid valve, said sealing device further comprising a washer element engageable with said second projecting end of said firing pipe, said washer element having a further groove in which a sealing gasket can be engaged, a ring nut being moreover provided which can be threaded on said second end of said firing pipe so as to tightly press said washer element against said outer surface of said tubular tank.

* * * * *